Sept. 11, 1934. K. SCHLECKER 1,973,111
HIGH TENSION ELECTRIC CABLE
Filed Feb. 25, 1931
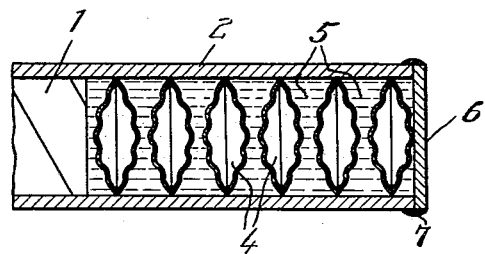
Inventor:
Karl Schlecker
by Knight Bros.
his att'ys.

UNITED STATES PATENT OFFICE 1,973,111

HIGH TENSION ELECTRIC CABLE

Karl Schlecker, Berlin-Grunewald, Germany, assignor to Siemens-Schuckertwerke Aktiengesellschaft, Berlin-Siemensstadt, Germany, a corporation of Germany Application February 25, 1931, Serial No. 518,269
In Germany March 3, 1930

1 Claim. (Cl. 173—266)

This invention relates to high tension electric cables and has for its object to maintain a satisfactory impregnation of the cables from the time they are manufactured until they are laid.

Hitherto it has generally been customary to ship and lay oil filled high tension cable lengths provided with longitudinal oil channels or cavities inside the cable, without their oil fillings, the filling being injected only after the cable length is laid. This requires evacuation of the cables and further makes it necessary to carry out operations on the cable line which are of a rather troublesome character in order to effect the impregnation with oil in a satisfactory manner. In order to avoid this it has already been proposed to impregnate the cables at the factory by completely filling them with oil whereupon, in order to avoid the escape of oil and to prevent the formation of hollow spaces in the cable, one end of the cable is provided with an oil reservoir which serves to keep the cable in a thoroughly impregnated condition over its whole length and is also of use for keeping the oil under a greater pressure than the pressure of the atmosphere. The other end of the cable is in the case of this arrangement closed in a pressure proof and oil tight manner by means of a suitable cap. The use of a separate vessel to serve as a reservoir is however subject to the disadvantage that for shipping such a cable specially prepared drums are necessary, whilst the oil reservoir requires a considerable amount of space.

The present invention has for its object to avoid the disadvantages previously mentioned and for this purpose according to the invention when pressing the lead sheath on to the cable the said lead sheath is made longer than the core of the cable so that a sufficiently long piece, for example, 1 or 2 metres of lead pipe, projects beyond the core of the cable. In this lead pipe are arranged a sufficient number of oil compensating chambers, which latter preferably comprise corregated tubes and which are subjected either to atmospheric pressure or to a certain higher pressure.

In the accompanying drawing, which represents a longitudinal section through a cable end, 1 indicates the end of the insulated cable conductors, and 2 the lead sheath, extending for a suitable length beyond the cable end 1. Within this extension are placed a number of gas-filled pressure compensating chambers 4, provided with corrugated end walls, as shown. The gas, for instance air, in these chambers may be at or above atmospheric pressure. These chambers are surrounded by the oil 5 contained in the extension, which communicates with the oil in the cable proper. The end of the sheath is closed by a cap 6 which is soldered to the sheath at 7.

In this manner the cable is maintained always filled with oil and the lead sheath is kept closed in a pressure proof and oil tight manner, whilst upon changes in temperature, that is to say upon expansion or contraction of the oil, the compensating chambers are compressed or expanded respectively, and thus keep the cable always completely filled with oil.

I claim as my invention:

Means for maintaining a high tension electric cable length, having insulated conductors and a surrounding lead sheath, continuously completely impregnated with insulating liquid within the sheath, from the time of completing the cable manufacture until it is laid, said means comprising at least at one end of the manufactured cable length an extension of the cable sheath for a suitable length beyond the cable conductors, said extension being closed at its outer end, and a plurality of corrugated compensating chambers surrounded by the cable liquid in said extension, and containing gas of at least atmospheric pressure, whereby the gas in said chambers, following the expansion and contraction of the cable liquid, maintains the cable completely filled with oil.

KARL SCHLECKER.